United States Patent [19]

Seyschab et al.

[11] Patent Number: 5,594,125
[45] Date of Patent: Jan. 14, 1997

[54] WATER-SOLUBLE CYCLODEXTRIN DERIVATIVES WITH LIPOPHILIC SUBSTITUENTS AND PROCESS FOR THEIR PREPARATION

[75] Inventors: Karl Seyschab, Ismaning; Benno Krüger; Sabine Delica, both of Müchen, all of Germany

[73] Assignee: Consortium Für elektrochemische Industrie GmbH, Müchen, Germany

[21] Appl. No.: 439,002

[22] Filed: May 11, 1995

[30] Foreign Application Priority Data

Aug. 12, 1994 [DE] Germany ............... 44 28 654.6

[51] Int. Cl.$^6$ ............... C08B 37/16; C11D 3/22; C14C 11/00; D06M 15/03
[52] U.S. Cl. ............... 536/103; 536/111; 536/120; 106/162.1; 252/8.61; 252/364; 252/397; 252/582; 252/601; 424/401; 510/276; 510/470; 510/356
[58] Field of Search ............... 536/103, 43, 44, 536/111, 120; 106/162; 252/8, 6, 364, 368, 397, 582, 601; 424/401; 514/54, 58, 974

[56] References Cited

U.S. PATENT DOCUMENTS

| | | | |
|---|---|---|---|
| 4,582,900 | 4/1986 | Brandt et al. | 536/103 |
| 4,764,604 | 8/1988 | Müller | 536/103 |

FOREIGN PATENT DOCUMENTS

| | | |
|---|---|---|
| 0146841 | 7/1985 | European Pat. Off. . |
| 0499322 | 8/1992 | European Pat. Off. . |
| 3710569 | 5/1988 | Germany . |
| 4035378 | 5/1992 | Germany . |
| 9200331 | 1/1992 | WIPO . |

OTHER PUBLICATIONS

J. Pitha, L Szabo & H. M. Fales, Carbohydr. Res. 1987, 168, 191–198 "Reaction of Cyclodextrius with Propylene Oxide or with Glycidol Analysis of Product Distribution".

U. R. Pharma Wardana, S. D. Christian E. E. Tucker R. W. Taylor J. F. Scamehorn, Langmuir 1993, g, 2258–2263.

Dr. T. Cserháti & Prof. Dr. J. Szejtli, Tenside Detergents 22 (1985) 5, 237.

F. M. Menger & D. Y. Williams, Tetrahedron Lett. 1986, vol. 27, No. 23, pp. 2579–2582.

Tetrahedron Letters, vol. 27, No. 23, 1986, pp. 2579–2582, F. M. Manger et al. "Synthesis and Properties of Surfactant-Cyclodextrin Conjugate", p. 2579, Fig. 4.

Database WPI, Week 9217, Derwent Publications Ltd., London, GB; AN 138444 & JP-A-04 081 403 (Kao Corp), Mar. 16, 1992.

Derwent Abstract AN 88–141408 corr. to DE 3710569.

*Primary Examiner*—Nathan M. Nutter
*Attorney, Agent, or Firm*—Collard & Roe, P.C.

[57] ABSTRACT

A water-soluble mixed ether of α-, β- or γ-cyclodextrin having at least one lipophilic and one hydrophilic radical per cyclodextrin molecule, of the following formula I:

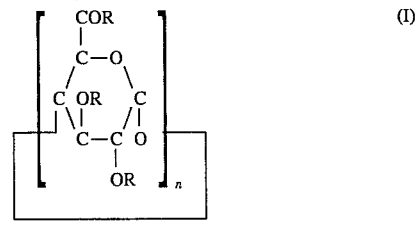

where
R is hydrogen or R1 or R2 and
R1 is a hydrophilic radical and
R2 is a lipophilic radical and
the MS for R1 is 0.3 to 2.0 and
the MS for R2 is 0.2 to 1.0 and
n is 6, 7, or 8.

14 Claims, No Drawings

WATER-SOLUBLE CYCLODEXTRIN DERIVATIVES WITH LIPOPHILIC SUBSTITUENTS AND PROCESS FOR THEIR PREPARATION

BACKGROUND OF THE INVENTION

1. Field of the Invention

The present invention relates to water-soluble cyclodextrin derivatives with lipophilic substituents and processes for their preparation.

Water-solubility in the context of the present invention is to be understood as meaning that the product is dissolved in water to the extent of at least 10% by weight at 20° C.

2. The Prior Art

Increasing the water-solubility of cyclodextrin derivatives and cyclodextrin complexes by introduction of hydroxyalkyl, dihydroxyalkyl or carboxymethyl groups is known in the prior art and is used, for example, on active compound complexes in the pharmaceutical sector. Mixed ethers with short-chain hydrophilic substituents show the same result.

J. Pitha, L. Szabo and H. M. Fales, Carbohydr. Res. 1987, 168, 191 describe the reaction of cyclodextrins with propene oxide or 3-hydroxypropene oxide in an aqueous base. This leads to very readily water-soluble derivatives with a relatively sharp and symmetric distribution of substituents.

WO 9200331 describes the preparation of hydroxyalkylated cyclodextrin derivatives by reaction of cyclodextrin with lower epoxides and further reaction thereof to give amino derivatives.

EP 499322 A1 describes the preparation and potential use of hydroxyalkylated cyclodextrin derivatives which contain additional carboxyalkyl groups.

EP 146841 A2 describes the preparation of water-soluble mixed ethers of β-cyclodextrin by reaction with lower epoxides (C1–C4).

The surface-active properties of the water-soluble cyclodextrin derivatives known to date are low in comparison with customary surfactants.

The use of water-soluble cyclodextrins and cyclodextrin derivatives in detergent solutions is made difficult by complexing of the surface-active substances, and is possible to only a limited extent. A number of surface-active cyclodextrin derivatives are described in the literature, methyl or hydroxypropyl substituents on the cyclodextrin already showing influences on the surface-active properties of the derivatives.

U. R. Dharmawardana, S. D. Christian, E. E. Tucker, R. W. Taylor and J. F. Scamehorn, Langmuir 1993, 9, 2258 report that cyclodextrins and cyclodextrin derivatives increase the surface tension and the critical micelle concentration of detergent solutions by formation of inclusion complexes with the detergents.

T. Cserhati and J. Szejtli, Tenside Deterg., 1985, 22, 237 report that methylated β-cyclodextrins have a detectable surface activity and lead to a reduction in surface tension in aqueous solution.

F. M. Menger and D. Y. Williams, Tetrahedron Lett. 1986, 27, 2579 disclose that water-insoluble cyclodextrin derivatives with longer-chain alkyl substituents display surface activity without the occurrence of a critical micelle concentration.

Cyclodextrin derivatives which are substituted by lipophilic substituents and have potent surface-active properties as a rule have a water-solubility of only significantly less than 10%.

DE 4,035,378 (corresponding to CA 117:113485) describes the possibility of finishing textile materials by treatment with cyclodextrin derivatives. To fix cyclodextrin to hydrophobic materials, anchor groups, such as longer-chain alkyl radicals, aryl radicals or alkylaryl radicals, which effect chiefly physical bonding via van der Waals' interactions, are proposed.

For technical and financial reasons (textile finishing processes are as a rule carried out in an aqueous medium), the cyclodextrin derivatives with extensive hydrophobic anchors which are proposed for finishing fabric and fibers of hydrophobic materials should have an adequate water-solubility so that auxiliaries (for example dispersing agents and the like) can largely be omitted.

Cyclodextrin derivatives which have a high surface activity could render the use of these auxiliaries completely superfluous.

SUMMARY OF THE INVENTION

It is an object of the present invention to provide water-soluble mixed ethers of α-, β-, or γ-cyclodextrin with at least one lipophilic and one hydrophilic radical per cyclodextrin molecule, of the following formula I:

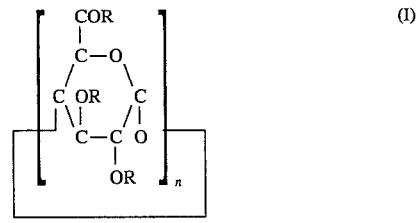

where

R is hydrogen or R1 or R2 and

R1 is a hydrophilic radical and

R2 is a lipophilic radical and the MS for R1 is 0.3 to 2.0 and the MS for R2 is 0.2 to 1.0 and n is 6, 7, or 8.

Preferably, R1 is identical or different and is methyl, ethyl, hydroxyethyl, hydroxy-i-propyl, hydroxy-n-propyl, dihydroxy-i-propyl, dihydroxy-n-propyl, carboxymethyl, carboxyethyl, carboxy-i-propyl, carboxy-n-propyl or an alkali metal salt of the carboxyalkyl substituents, and R2 is identical or different and is $C_5$–$C_{12}$ hydroxy-alkyl, $C_6$–$C_{10}$ hydroxycycloalkyl, or hydroxypropyl which is substituted by $C_4$–$C_{12}$ alkyloxy and/or $C_6$–$C_{10}$ aryloxy and/or $C_7$–$C_{15}$ aralkyloxy radicals, where the alkyl radicals can be unbranched or branched.

Particularly preferably, R1 is identical or different and is methyl, 2-hydroxypropyl, 2,3-dihydroxypropyl, Na-carboxymethyl, K-carboxymethyl or Li-carboxymethyl and R2 is hydroxyhexyl, hydroxyoctyl, hydroxydecyl, hydroxycyclohexyl, hydroxycyclooctyl, 3-butoxy-hydroxypropyl, 3-hexyloxyhydroxypropyl, 3-(2-ethylhexyloxy)-hydroxypropyl, 3-octyloxy-hydroxypropyl, 3-phenyloxy-hydroxypropyl, 3-cresyloxy-hydroxypropyl or 3-naphthyloxy-hydroxypropyl, where the alkyl radicals are unbranched and even-numbered.

The MS for R1 is preferably 0.3 to 1.0, particularly preferably 0.4 to 0.6.

The MS for R2 is preferably 0.2 to 0.6, particularly preferably 0.3 to 0.5.

n is preferably 7.

The "MS" is the degree of molar substitution, i.e. the average number of moles of the substituted reagent which have been bonded in ether form per mole of anhydroglucose unit.

In contrast to known cyclodextrin derivatives with lipophilic substituents, which are sparingly soluble to insoluble in water, aqueous solutions having a content of sometimes more than 30% by weight of cyclodextrin derivative according to the invention can be prepared from the cyclodextrin derivatives according to the invention. Solutions having a cyclodextrin content of sometimes more than 50% by weight can be prepared from the preferred derivatives according to the invention. In contrast to known water-soluble cyclodextrin derivatives, the derivatives according to the invention display a high surface activity. Thus, for example, the surface tension of the derivatives is significantly below the surface tension of known water-soluble cyclodextrin derivatives.

The invention furthermore relates to processes for the preparation of cyclodextrin derivatives according to formula I.

In the process according to the invention, $\alpha$-, $\beta$- or $\gamma$-cyclodextrin, individually or in any desired mixture, is reacted in a basic liquid reaction medium with at least one etherifying agent which leads to lipophilic substituents on the cyclodextrin and at least one etherifying agent which leads to hydrophilic substituents on the cyclodextrin.

In a further embodiment of the processes according to the invention, it is also possible to react a hydrophilic cyclodextrin derivative with an etherifying agent which leads to lipophilic substituents on the cylcodextrin.

$\alpha$-, $\beta$- and/or $\gamma$-cyclodextrins such as are commercially obtainable can be employed in the process according to the invention. However, the cyclodextrins can likewise be prepared in a manner known per se, for example, by enzymatic reaction of starch with cyclodextrin glycosyltransferase (CGTase E.C.2.4.1.19). Partly substituted cyclodextrin derivatives, such as, for example, cyclodextrin ethers and esters, can be employed in the above mentioned process embodiment. Examples of such derivatives are partly substituted hydroxyalkylcyclodextrins, such as hYdroxypropylcyclodextrin or dihydroxypropylcyclodextrin, partly substituted carboxyalkylcyclodextrins, such as carboxymethylcyclodextrin, alkali metal salts of partly substituted carboxyalkylcyclodextrins or partly substituted water-soluble alkylcyclodextrins, such as $C_1$ to $C_4$ alkylcyclodextrins.

$\alpha$-, $\beta$- and/or $\gamma$-cyclodextrins, or, in the process embodiment, hydroxypropylcyclodextrin, dihydroxypropylcyclodextrin, Na carboxymethylcyclodextrin or partly substituted methylcyclodextrin are preferably employed in the process according to the invention.

The cyclodextrins can be employed in the commercially available quality with a water content of preferably between 0% and 15% by weight. They do not have to meet particular requirements with respect to purity. For cost reasons, cyclodextrins or cyclodextrin derivatives having a water content of as a rule 10% to 15% by weight, such as are commercially obtainable, are particularly preferably employed.

Etherifying agents which lead to lipophilic substituents on the cyclodextrin and which are employed are preferably branched or unbranched $C_4$–$C_{12}$ alkyl epoxides, such as, for example, 1-hexene oxide, 1-octene oxide or 1-decene oxide, cyclic $C_6$–$C_{10}$ epoxides, such as, for example, cyclohexene oxide or cyclooctene oxide, or branched or unbranched $C_4$–$C_{12}$ alkyl glycidyl ethers, such as n-butyl glycidyl ether, n-hexyl glycidyl ether, n-octyl glycidyl ether or 2-ethylhexyl glycidyl ether, or $C_6$–$C_{15}$ aryl or aralkyl glycidyl ethers, such as phenyl glycidyl ether or cresyl glycidyl ether, or mixtures of the substances mentioned.

1-Hexene oxide, 1-octene oxide, 1-decene oxide, cyclohexene oxide, cyclooctene oxide, n-butyl glycidyl ether, n-hexyl glycidyl ether, n-octyl glycidyl ether, 2-ethylhexyl glycidyl ether, phenyl glycidyl ether or cresyl glycidyl ether are particularly preferably employed.

Etherifying agents which lead to hydrophilic substituents on the cyclodextrin and which are employed are preferably $C_2$–$C_3$ alkyl epoxides, $C_3$–$C_4$ hydroxyalkyl epoxides, methyl halides, ethyl halides, halocarboxylic acids with one or 2 carbon atoms or alkali metal salts of halocarboxylic acids with 2 or 3 carbon atoms, or mixtures of the substances mentioned.

Ethylene oxide, propylene oxide, hydroxypropene oxide, chloroacetic acid or the Na salt thereof or methyl chloride are particularly preferably employed.

The etherifying agents are employed in the commercially available purity.

The basic liquid reaction medium employed is preferably a 1% to 50% (by weight) strength alkali metal hydroxide aqueous solution, for example a sodium hydroxide, potassium hydroxide or lithium hydroxide aqueous solution.

A 2% to 15% (by weight) strength sodium hydroxide (aqueous) solution is preferably employed.

If appropriate, at least one organic solvent, such as, for example, methanol, ethanol, isopropanol or THF, can also be present in the reaction medium in amounts of up to 30% by weight.

According to the invention, the cyclodextrin (if appropriate in the presence of an organic solvent) is preferably first mixed into the mixture of water and alkali metal hydroxide, after which the etherifying agent is added in one or more stages. The process of mixed ether formation can thus be carried out in one stage in the presence of at least two different etherifying agents. However, it can be carried out in two stages in the presence of one etherifying agent per stage.

In a two-stage procedure for the etherification reaction, a change in the base concentration can be achieved by addition of alkali metal hydroxide or partial neutralization of the reaction mixture before addition of the second etherifying reagent (depending on the reactivity of the second alkylating agent).

Preferably, in the case of a reaction of cyclodextrin with at least 2 different etherifying agents, 1–30 mol, preferably 2–20 mol, particularly preferably 3–10 mol, of the etherifying agent which introduces hydrophilic substituents on the cyclodextrin and 1–20 mol, preferably 1.5–10 mol, particularly preferably 1.5–8 mol, of the etherifying agent which introduces lipophilic substituents on the cyclodextrin are employed per mole of cyclodextrin.

The cyclodextrin and reaction medium are preferably employed in a ratio of the amounts of cyclodextrin/reaction medium of 1:0.7 to 1:10, preferably about 1:1 to 1:5, these figures also including the organic solvent which may be added to the basic reaction medium.

For carrying out one embodiment of the process according to the invention, an alkylated water-soluble cyclodextrin derivative is introduced into the mixture of water and alkali metal hydroxide, and the second etherifying agent is then added, preferably in a molar ratio of cyclodextrin derivative/etherifying agent of 1:1 to 1:20, particularly preferably 1:1.5 to 1:8.

The particular reaction mixtures and vessels can be flushed with inert gases, such as nitrogen, to prevent oxidative secondary reactions.

The reaction proceeds in solution or in suspension, preferably in solution. The reaction proceeds particularly successfully at a temperature of between 0° C. and 120° C., preferably 20° C. and 100° C., depending on the reactivity and volatility of the etherifying agent used, in the case of introduction of hydrophilic and lipophilic substituents into cyclodextrin and at 40° C. to 120° C., in the case of introduction of a lipophilic substituent.

The time required for the etherification reaction is in general between 2 hours and 15 hours depending on the reaction temperature.

The mixture is then stirred for 1–24 hours at 20°–30° C. (preferably after addition of inorganic aqueous acid until the bases which have still not been used are neutralized). Thereafter, where appropriate, insoluble by-products are separated off by means of a separating device (for example centrifuge or filter device) and the mixture is freed from most of the liquid components (for example by means of a distillation apparatus or a dialyzer).

The cyclodextrin derivatives according to the invention thus obtained can be purified as known from the prior art. For example, for this purpose, the concentrated aqueous solution is added dropwise into about ten times the amount, based on the volume of the aqueous phase, of an organic solvent. The product which has precipitated is filtered off or centrifuged (for example 10 minutes at 10 g) and then dried. The dried precipitate is dissolved. Water, for example, can be used as the solvent.

The products can also be purified by other methods known for purification of cyclodextrin or cyclodextrin derivatives. Examples of such methods are direct crystallization, adsorption onto active charcoal, ion exchanger chromatography or gel permeation chromatography.

Further purification of the cyclodextrin derivatives obtained according to the invention can be carried out, as is likewise known from the prior art, for example, by column chromatography or preparative HPLC or dialysis (for example dialysis hoses of benzoylated cellulose, Sigma, D-8024 Deisenhofen).

The cyclodextrin derivatives according to the invention are suitable for all the known uses of cyclodextrins and cyclodextrin derivatives.

They are particularly suitable for solubilizing sparingly water-soluble compounds, such as, for example, steroids, as formulation auxiliaries in pharmaceutical, cosmetic and agrochemical products, for stabilizing substances which are sensitive to light, heat or oxidation, for replacing organic solvents, in particular in the separation and extraction of substances from lipophilic media, as auxiliaries, in particular for coating and/or adhesion promotion in the paper, leather and textile industry, as phase transfer catalysts and for masking flavor and odor.

The cyclodextrins according to the invention are particularly suitable as surface-active substances. For example, they can replace environmentally polluting surfactants in aqueous cleaning mixtures. Because of their capacity for degreasing and cleaning any desired surfaces (for example in the processing of metals or coating of metals), the cyclodextrins according to the invention are furthermore suitable for uses for which environmentally polluting organic solvents (for example halogenated hydrocarbons) have been employed to date. The present invention therefore furthermore relates to cleaning compositions comprising cyclodextrin derivatives according to the invention.

The cyclodextrins according to the invention furthermore allow, in an advantageous manner, fixing of cyclodextrin units to any desired hydrophobic materials, such as polymers, polymer compounds, fabrics and fibers, via non-covalent interactions. This fixing can be effected without organic solvents in aqueous media (for example dyeing solutions in the textile industry, polymer dispersions and the like).

The fixed cyclodextrin units can be used for binding auxiliaries, such as, for example, antioxidants, fungicides, bactericides, UV stabilizers and the like, and can thus reduce the amounts of these substances to be employed.

In the case of fixing to hydrophobic textile materials (for example polyester materials), the cyclodextrin derivatives according to the invention are suitable for finishing fabric, in particular for improving the handle properties and the staining properties, and for increased absorption of odor. The present invention therefore also relates to textile finishing compositions, in particular those for polyester materials, comprising cyclodextrin derivatives according to the invention.

Other objects and features of the present invention will become apparent from the following Examples, which disclose the embodiments of the present invention. It should be understood, however, that the Examples are designed for the purpose of illustration only and not as a definition of the limits of the invention.

The following examples serve to illustrate the invention in greater detail.

In the examples, percentage data are based on weight.

EXAMPLE 1

Preparation of
2-hydroxypropyl-2-hydroxyhexyl-β-cyclodextrin 14.9 g of sodium hydroxide were dissolved in 1.60 l of water, and 400 g of hydroxypropyl-β-cyclodextrin (MS: 0.77) were added. 94.1 g of 1,2-epoxyhexane were added at 80° C., while stirring, and when the addition had ended the mixture was stirred at this temperature for a further 10 hours. After cooling, the mixture was neutralized by addition of 2N hydrochloric acid. The neutralized solution was freeze-dried. A sample of the resulting product was purified by dialysis against deionized water, freeze-dried and then analyzed. MS (hydroxypropyl: 0.75, hydroxyhexyl: 0:41).

EXAMPLE 2

Preparation of
2-hydroxypropyl-2-hydroxyhexyl-β-cyclodextrin 0.50 g of sodium hydroxide was dissolved in 40 ml of water, and 10.0 g of β-cyclodextrin were suspended in the solution. 2.90 g of epoxypropane and 3.10 g of 1,2-epoxyhexane were added at 25° C. and the mixture was stirred at 30° C. for 2 hours. The temperature of the mixture was then increased to 80° C. and the mixture was stirred at this temperature for a further 3 hours. After cooling, the mixture was neutralized with 2N hydrochloric acid and purified by dialysis and the product was then freeze-dried.

Yield 12.5 g, MS (hydroxypropyl: 0.64, hydroxyhexyl: 0.39).

EXAMPLE 3

Preparation of 2-hydroxypropyl-2-hydroxyhexyl-β-cyclodextrin 1.00 g of sodium hydroxide was dissolved in 80 ml of water, and 20.0 g of β-cyclodextrin were suspended in the solution. 2.80 g of epoxypropane were added at 25° C. and the mixture was stirred at 25° C. for 2 hours. The reaction temperature was then increased to 80° C. and 5.60 g of 1,2-epoxyhexane were added dropwise. When the addition had ended, the mixture was stirred at 80° C. for a further 8 hours and then neutralized at 25° C. by addition of 2N hydrochloric acid. Thereafter, the mixture was purified by dialysis and the product was then freeze-dried.
Yield 21.5 g, MS (hydroxypropyl: 0.20; hydroxyhexyl: 0.39).

EXAMPLE 4

Preparation of 2-hydroxypropyl-2-hydroxyhexyl-α-cyclodextrin 0.50 g of sodium hydroxide was dissolved in 40 ml of water, and 10.0 g of β-cyclodextrin were dissolved in the solution. 2.90 g of epoxypropane and 3.90 g of 1,2-epoxyhexane were added at 25° C. and the mixture was stirred at 30° C. for 2 hours. The temperature of the mixture was then increased to 80° C. and the mixture was stirred at this temperature for a further 4 hours. After cooling, the mixture was neutralized with 2N hydrochloric acid and purified by dialysis and the product was then freeze-dried.
Yield 14.5 g, MS (hydroxypropyl: 0.44; hydroxyhexyl: 0.34).

EXAMPLE 5

Preparation of 2-hydroxypropyl-2-hydroxyhexyl-γ-cyclodextrin 0.50 g of sodium hydroxide was dissolved in 40 ml of water, and 10.0 g of γ-cyclodextrin were dissolved in the solution. 2.90 g of epoxypropane and 3.90 g of 1,2-epoxyhexane were added at 25° C. and the mixture was stirred at 30° C. for 2 hours. The temperature of the mixture was then increased to 80° C. and the mixture was stirred at this temperature for a further three hours. After cooling, the mixture was neutralized with 2N hydrochloric acid and purified by dialysis and the product was then freeze-dried.
Yield 15.0 g, MS (hydroxypropyl: 0.46; hydroxyhexyl: 0.40).

EXAMPLE 6

Preparation of 2,3-dihydroxypropyl-2-hydroxyhexyl-β-cyclodextrin 400 g of β-cyclodextrin were suspended in a solution of 19.7 g of sodium hydroxide in 2.00 l of water, and 91.0 g of 2,3-epoxy-1-propanol were added dropwise at a temperature of 80° C., while stirring. After a reaction time of 6 hours, 123 g of 1,2-epoxyhexane were added dropwise at this temperature and the mixture was stirred at 80° C. for a further 8 hours. After cooling, the mixture was neutralized by addition of 2N hydrochloric acid. The neutralized solution was freeze-dried. A sample of the resulting product was purified by dialysis against deionized water, freeze-dried and then analyzed.
MS (dihydroxypropyl: 0.38; hydroxyhexyl: 0.40).

EXAMPLE 7

Preparation of Carboxymethyl-2-hydroxyhexyl-β-cyclodextrin Sodium Salt 18.4 g of sodium hydroxide were dissolved in 1.60 l of water, and 400 g of carboxymethyl-β-cyclodextrin sodium salt (DS 0.6) were added. 116 g of 1,2-epoxyhexane were added dropwise at 80° C., while stirring, and when the addition had ended the mixture was stirred at this temperature for a further 10 hours. After cooling, the mixture was neutralized with 2N hydrochloric acid. The neutralized solution was freeze-dried. A sample of the resulting product was purified by dialysis against deionized water, freeze-dried and then analyzed.
MS (carboxymethyl: 0.52; hydroxyhexyl: 0.37).

EXAMPLE 8

Preparation of Carboxymethyl-2-hydroxyhexyl-β-cyclodextrin Sodium Salt 2.85 g of sodium hydroxide and 20 g of β-cyclodextrin were dissolved in 17 ml of water, and 6.20 g of sodium chloroacetate were added at 25° C. The mixture was heated, while stirring, at 60° C. for 2 hours and then at 90° C. for 4 hours, before it was diluted with 60 ml of water at 25° C. 0.74 g of sodium hydroxide and 6.20 g of 1,2-epoxyhexane were added and the mixture was then stirred at 80° C. for 8 hours. After cooling, the mixture was neutralized with 2N hydrochloric acid and the product was purified by dialysis.
Yield 18.5 g, MS (carboxymethyl: 0.35; hydroxyhexyl: 0.35).

EXAMPLE 9

Preparation of 2-hydroxypropyl-(2-hydroxy-3-phenoxy-propyl)-β-cyclodextrin 550 g of hydroxypropyl-β-cyclodextrin (MS 0.9) were introduced into a solution of 8.00 g of sodium hydroxide in 400 ml of water, and 180 g of 3-phenoxy-1-epoxypropane were added dropwise at 80° C., while stirring. When the addition had ended, the mixture was stirred at this temperature for a further 8 hours and then neutralized at 25° C. by addition of 2 N hydrochloric acid. Liquid constituents were distilled off to dryness in vacuo and the residue was dissolved in 1.0 l of ethanol. After the insoluble constituents had been separated off, the ethanolic solution was introduced into 10.0 l of diethyl ether, and the cyclodextrin derivative which has precipitated was filtered off with suction. Water-soluble contents were extracted with 6.0 l of water. The aqueous extract was freeze-dried. A sample of the resulting product was purified by dialysis against deionized water, freeze-dried and then analyzed.
MS (hydroxypropyl: 0.90; 2-hydroxy-3-phenoxypropyl: 0.35).

EXAMPLE 10

Preparation of Carboxymethyl-(2-hydroxy-3-phenoxypropyl)-β-cyclodextrin Sodium Salt 500 g of carboxymethyl-β-cyclodextrin sodium salt (DS 0.6) were dissolved in 417 ml of 2% strength aqueous sodium hydroxide solution, and 225 g of 3-phenoxy-1- epoxypropane were added dropwise at 80° C. while stirring When the addition had ended, the mixture was stirred at this temperature for a further 8 hours and then neutralized at 25° C. by addition of 2N hydrochloric acid. The neutralized solution was freeze-dried. A sample of the resulting product was purified by dialysis against deionized water, freeze-dried and then analyzed.

MS (carboxymethyl: 0.60; 2-hydroxy-3-phenoxypropyl: 0.61).

EXAMPLE 11

Preparation of 2-hydroxypropyl-(2-hydroxy-3-(2-ethylhexyloxy)-propyl)-β-cyclodextrin 550 g of hydroxypropyl-β-cyclodextrin (MS: 0.9) were introduced into a solution of 8.00 g of sodium hydroxide in 400 ml of water, and 275 g of 3-(2-ethyl-hexyloxy)-1-epoxypropane were added dropwise at 80° C., while stirring. When the addition had ended, the mixture was stirred at this temperature for a further 8 hours and then neutralized at 25° C. by addition of half-concentrated and 2N hydrochloric acid. Liquid constituents were distilled off to dryness in vacuo and the residue was dissolved in 1.0 l of ethanol. After the insoluble constituents had been centrifuged off, the ethanolic solution was introduced into 10.0 l of methyl tert-butyl ether, and the cyclodextrin derivative which had precipitated was filtered off with suction. Water-soluble contents were extracted with 6.0 l of water. The aqueous extract was freeze-dried. A sample of the resulting product was purified by dialysis against deionized water, freeze-dried and then analyzed.

MS (hydroxypropyl: 0.90; 2-hydroxy-3-(2-ethylhexyloxy)propyl: 0.23).

EXAMPLE 12

Preparation of 2,3-dihydroxypropyl-(2-hydroxy-3-(2-ethylhexyloxy)-propyl)-β-cyclodextrin 550 g of β-cyclodextrin were added to a solution of 40.0 g of sodium hydroxide in 800 ml of water, and 165 ml of 3-hydroxy-1-epoxypropane were added dropwise at 25° C., while stirring. When the addition had ended, the mixture was stirred at 40° C. for 3 hours, and 210 g of 3-(2-ethylhexyloxy)-1-epoxypropane were then added at this temperature. The mixture was then heated at 80° C. for 3 hours, while stirring. After cooling, the mixture was neutralized at 25° C. by addition of half-concentrated and 2N aqueous hydrochloric acid, and the solvent and volatile constituents were then stripped off in vacuo. The residue was extracted with 1.0 l of ethanol, and the resulting ethanolic solution was filtered and introduced into 10.0 l of methyl tert-butyl ether. The cyclodextrin derivative which had precipitated was centrifuged off and dissolved in 6.0 l of hot water at 80° C. Undissolved constituents were filtered off and the solution which remained was freeze-dried.

Yield: 350 g, MS (2,3-dihydroxypropyl: 0.60; 2-hydroxy-3-(2-ethyloxyloxy)-propyl: 0.34).

EXAMPLE 13

Preparation of Carboxymethyl-(2-hydroxy-3-(2-ethyl-hexyloxy)-propyl-β-cyclodextrin Sodium Salt 500 g of carboxymethyl-β-cyclodextrin sodium salt (DS 0.6) were dissolved in 417 ml of 2% strength aqueous sodium hydroxide solution, and 444 g of 3-(2-ethylhexyloxy)-1-epoxypropane were added dropwise at 80° C., while stirring. When the addition had ended, the mixture was stirred at this temperature for a further 8 hours, and then neutralized at 25° C. by addition of concentrated and 2N aqueous hydrochloric acid. The resulting solution was washed twice with 1.0 l of diethyl ether and then freeze-dried. A sample of the resulting product was purified by dialysis against deionized water, freeze-dried and then analyzed.

MS (carboxymethyl: 0.60; 2-hydroxy-3-(2-ethylhexyloxy)propyl: 0.41).

EXAMPLE 14

Preparation of 2-hydroxypropyl-(2-hydroxy-3-butyloxypropyl)-β-cyclodextrin 165 g of β-cyclodextrin was dissolved in 240 ml of 5% strength aqueous sodium hydroxide solution, and 51.0 ml of propene oxide were added at 25° C., while stirring. When the addition had ended, the mixture was stirred at 35° C. for 3 hours, and then heated at 80° C. for 0.5 hour. 48.8 g of 3-butyloxy-1-epoxypropane were added at this temperature, while stirring, and the mixture was stirred for a further 3 hours. When the reaction had ended, the mixture was neutralized at 25° C. by addition of half-concentrated and 2N hydrochloric acid, and volatile constituents were then distilled off in vacuo. The residue was dissolved in 300 ml of methanol and insoluble constituents were centrifuged off. The methanolic solution was stirred into 3.0 l of diethyl ether and the cyclodextrin derivative which had precipitated was filtered off with suction and dried in vacuo.

Yield: 200 g, MS (hydroxypropyl: 0.63; 2-hydroxy-3-butyloxypropyl: 0.32).

EXAMPLE 15

Preparation of Methyl-(2-hydroxyhexyl-β-cyclodextrin 0.50 g of sodium hydroxide was dissolved in 40 ml of water, and 12.0 g of methyl-β-cyclodextrin (MS: 0.6) were suspended in the solution. 3.70 ml of 1,2-epoxyhexane were added at 25° C. and the mixture was stirred at 80° C. for 6 hours. After cooling, it was neutralized with 2N hydrochloric acid and purified by dialysis and the product was then freeze-dried.

Yield: 10.6 g, MS (methyl: 0.60, hydroxyhexyl: 0.34).

EXAMPLE 16

Preparation of 2-hydroxypropyl-(2-hydroxyoctyl)-β-cyclodextrin 11.0 g of β-cyclodextrin were dissolved in 16.0 ml of 5% strength aqueous sodium hydroxide solution, and 3.40 ml of epoxypropane were added at 25° C. When the addition had ended, the mixture was stirred at 35° C. for 3 hours, and 3.80 ml of 1,2-epoxyoctane were then added at this temperature. The temperature of the mixture was then increased to 80° C. and the mixture was stirred at this temperature for a further 3 hours. After cooling, the mixture was neutralized with 2N hydrochloric acid and volatile components were stripped off in vacuo. The residue was taken up in 50 ml of methanol and, after filtration, the cyclodextrin derivative was precipitated by stirring the filtrate into 300 ml of methyl tert-butyl ether. The precipitate was extracted with 100 ml of water, insoluble contents were separated off by filtration and the product was then purified by dialysis.
Yield: 12.0 g, MS (hydroxypropyl: 0.64, hydroxyoctyl: 0.29).

EXAMPLE 17

Preparation of Carboxymethyl-(2,-hydroxydecyl)-β-cyclodextrin Sodium Salt 13.8 g of carboxymethyl-β-cyclodextrin sodium salt (DS 0.6) were dissolved in 16.0 ml of 5% strength aqueous sodium hydroxide solution, and 3.90 g of 1,2-epoxydecane were added dropwise at 30°–40° C. while stirring When the addition had ended, the mixture was stirred at 80° C. for a further 8 hours and then neutralized at 25° C. by addition of 2N aqueous hydrochloric acid. The resulting solution was purified by dialysis.
Yield: 14.0 g, MS (carboxymethyl: 0.60, 2-hydroxydecyl: 0.19).

EXAMPLE 18 of 2-hydroxypropyl-(2-hydroxy-3-(o-cresyloxy)-propyl)-β-cyclodextrin 13.0 g of carboxymethyl-β-cyclodextrin sodium salt (DS 0.6) were dissolved in 16.0 ml of 5% strength aqueous sodium hydroxide solution at 25° C. 3.80 g of 3-ortho-cresyloxy-1-epoxypropane were added at 25° C. and the mixture was stirred at 80° C. for 6 hours. After cooling, it was neutralized with 2N hydrochloric acid and purified by dialysis and the product was then freeze-dried.
Yield: 14.0 g, MS (carboxymethyl: 0.60; 2-hydroxy-3-(o-cresyloxy)-propyl: 0.26) .

EXAMPLE 19

Preparation of 2-Hydroxypropyl-(2-hydroxy-3-octyloxypropyl)-β-cyclodextrin 11.0 g of β-cyclodextrin were dissolved in 16.0 ml of 5% strength aqueous sodium hydroxide solution, and 3.40 ml of epoxypropane and 4.70 g of 3-octyloxy-1-epoxypropane were added at 25° C. When the addition had ended, the mixture was stirred at 35° C. for 2 hours and the temperature of the mixture was then increased to 80° C. The mixture was stirred at this temperature for a further 3 hours and, after cooling, neutralized with 2N hydrochloric acid. The mixture was purified by dialysis and the product was then freeze-dried.
Yield: 12.0 g, MS (hydroxypropyl: 0.60, 2-hydroxy-3-octyloxy-propyl: 0.36).

In the following Examples 20–22, the advantageous properties of the cyclodextrin derivatives according to the invention are compared with those of known cyclodextrin derivatives. The known derivatives 2-hydroxypropyl-β-cyclodextrin (MS=0.60), 2,3-dihydroxy-β-cyclodextrin (MS=0.6), carboxymethyl-β-cyclodextrin sodium salt (MS= 0.55) and 2-hydroxyhexyl-β-cyclodextrin (MS=0.35) were prepared analogously to the examples described so far, the addition of the second alkylating agent being omitted.

Water soluble mixed ethers substituted by lipophilic substituents which are mentioned below and have not hitherto been described were prepared analogously to Examples 1 to 19.

EXAMPLE 20

Determination and Comparison of the Water-solubility of Various Cyclodextrin Derivatives The water-solubility of the mixed ethers according to the invention substituted by lipophilic and hydrophilic substituents and of the cyclodextrin derivative substituted exclusively by lipophilic substituents was determined at 25° C. by residue determination after withdrawal of the solvent from saturated solutions.

The water-solubility at 25° C. of 2-hydroxyhexyl-substituted β-cyclodextrin mixed ethers is compared with 2-hydroxyhexylated β-cyclodextrin in Table 1. The mixed ethers according to the invention are distinguished by a solubility in water at 25° C. which is sometimes more than twenty times higher.

TABLE 1

| $R_1$/MS | $R_2$/MS | Water-Solubility/ % by weight |
|---|---|---|
| — | 2-Hydroxyhexyl/0.35 | about 2.5 |
| Methyl/0.60 | 2-Hydroxyhexyl/0.34 | >40 |
| 2-Hydroxypropyl/ 0.75 | 2-Hydroxyhexyl/0.41 | >50 |
| 2,3-Dihydroxy-propyl/0.38 | 2-Hydroxyhexyl/0.40 | >50 |
| Na-Carboxymethyl/ 0.35 | 2-Hydroxyhexyl/0.35 | >50 |

EXAMPLE 21

Determination and Comparison of the Surface Tension of Various Cyclodextrin Derivatives The surface tension was determined with a Digital Tensiometer K10 (Krüss) in 0.5% strength aqueous solutions of the derivatives.

Surface tensions (ST) of 0.5% strength aqueous solutions of the mixed ethers according to the invention substituted by lipophilic substituents are compared with derivatives substituted exclusively by lipophilic substituents by way of example with the aid of some 2-hydroxyhexyl-substituted β-cyclodextrin derivatives in Table 2.

The compounds are distinguished by surface tensions at 25° C. which are significantly below those of 2-hydroxyhexylated β-cyclodextrin.

TABLE 2

| $R_1$/MS | $R_2$/MS | ST $mN*m^{-1}$ |
|---|---|---|
| — | 2-Hydroxyhexyl/0.35 | 43.8 |
| Methyl/0.60 | 2-Hydroxyhexyl/0.34 | 35.6 |
| 2-Hydroxypropyl/ 0.75 | 2-Hydroxyhexyl/0.41 | 31.8 |
| 2,3-Dihydroxypropyl/ 0.38 | 2-Hydroxyhexyl/0.40 | 35.8 |
| Na-Carboxymethyl/ 0.35 | 2-Hydroxyhexyl/0.35 | 34.1 |

Table 3 provides a comparison of the surface tensions (ST) of 0.5% strength aqueous solutions of some β-cyclodextrin derivatives according to the invention substituted by lipophilic substituents with known water-soluble cyclodextrin derivatives. The surface tensions of the readily water-soluble mixed ethers (as a rule above 30% by weight) are in

TABLE 3

| $R_1$/MS | $R_2$/MS | ST $mN*m^{-1}$ |
|---|---|---|
| 2-Hydroxypropyl/0.60 | — | 58.2 |
| 2,3-Dihydroxypropyl/0.55 | — | 69.5 |
| Na-Carboxymethyl/0.60 | — | 60.1 |
| 2-Hydroxypropyl/0.75 | 2-Hydroxyhexyl/0.41 | 31.8 |
| 2,3-Dihydroxypropyl/0.38 | 2-Hydroxyhexyl/0.40 | 35.8 |
| Na-Carboxymethyl/0.35 | 2-Hydroxyhexyl/0.35 | 34.1 |
| Methyl/0.60 | 2-Hydrocyhexyl/0.34 | 35.6 |
| 2-Hydroxypropyl/0.64 | 2-Hydroxyoctyl/0.29 | 34.3 |
| Na-Carboxymethyl/0.60 | 2-Hydroxydecyl/0.19 | 34.2 |
| 2-Hydroxpropyl/0.32 | 2-Hydroxy-3-(butyloxy)-propyl/0.63 | 43.0 |
| Na-Carboxymethyl/0.60 | 2-Hydroxy-3-(octyloxy)-propyl/0.36 | 29.8 |
| 2-Hydroxypropyl/0.56 | 2-Hydroxy-3-(2-ethylhexyloxy)-propyl/0.28 | 29.2 |
| Na-Carboxymethyl/0.60 | 2-Hydroxy-3-(2-ethylhexyloxy)-propyl/0.41 | 35.3 |
| Na-Carboxymethyl/0.60 | 2-Hydroxy-3-(phenyloxy)-propyl/0.61 | 40.7 |
| 2-Hydroxypropyl/0.60 | 2-Hydroxy-3-(o-cresyloxy)-propyl/0.30 | 37.5 |
| Na-Carboxymethyl/0.60 | 2-Hydroxy-3-(o-cresyloxy)-propyl/0.26 | 45.7 |

While several embodiments of the present invention have been shown and described, it is to be understood that many changes and modifications may be made thereunto without departing from the spirit and scope of the invention as defined in the appended claims.

What is claimed is:

1. A water-soluble mixed ether of β-cyclodextrin with at least one lipophilic radical per cyclodextrin molecule, and at least one hydrophilic radical per cyclodextrin molecule, of the following formula I:

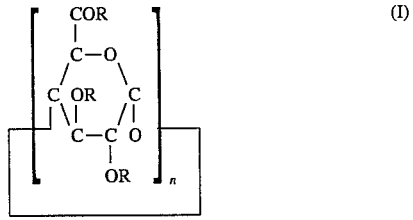

where

R is hydrogen or R1 or R2 and

R1 is a hydrophilic radical and

R2 is a lipophilic radical and the MS for R1 is 0.3 to 2.0 and the MS for R2 is 0.2 to 1.0 and n is 7.

2. A water-soluble mixed ether according to claim 1, wherein R1 is identical or different and is selected from the group consisting of methyl, ethyl, hydroxyethyl, hydroxy-i-propyl, hydroxy-n-propyl, dihydroxy-i-propyl, dihydroxy-n-propyl, carboxymethyl, carboxyethyl, carboxy-i-propyl, carboxy-n-propyl and an alkali metal salt of the carboxyalkyl substituents, and R2 is identical or different and is selected from the group consisting of $C_5$–$C_{12}$ hydroxyalkyl, $C_6$–$C_{10}$ hydroxycycloalkyl, and hydroxypropyl which is substituted by $C_4$–$C_{12}$ alkyloxy and/or $C_6$–$C_{10}$ aryloxy and/or $C_7$–$C_{15}$ aralkyloxy radicals, where the alkyl radicals can be unbranched or branched.

3. A water-soluble mixed ether according to claim 1, wherein

R1 is identical or different and is selected from the group consisting of methyl, 2-hydroxypropyl, 2,3-dihydroxypropyl, Na-carboxymethyl, K-carboxymethyl and Li-carboxymethyl; and R2 is identical or different and is selected from the group consisting of hydroxyhexyl, hydroxyoctyl, hydroxydecyl, hydroxycyclohexyl, hydroxycyclooctyl, 3-butoxyhydroxypropyl, 3-hexyloxyhydroxypropyl, 3-(2-ethylhexyloxy)-hydroxypropyl, 3-octyloxy-hydroxypropyl, 3-phenyloxy-hydroxypropyl, 3-cresyloxy-hydroxypropyl and 3-naphthyloxy-hydroxypropyl, where the alkyl radicals are unbranched and even numbered.

4. A water soluble mixed ether as claimed in claim 2, wherein the MS for R1 is 0.3 to 1.0; and wherein the MS for R2 is 0.2 to 0.6.

5. A process for the preparation of a water-soluble mixed ether of β-cyclodextrin with at least one lipophilic radical per cyclodextrin molecule and at least one hydrophilic radical per cyclodextrin molecule, of the following formula I:

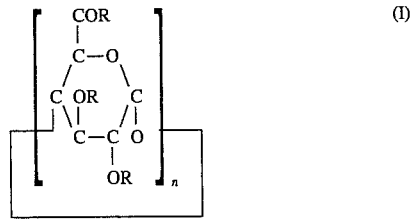

where

R is hydrogen or R1 or R2 and

R1 is a hydrophilic radical and

R2 is a lipophilic radical and the MS for R1 is 0.3 to 2.0 and the MS for R2 is 0.2 to 1.0 and n is 7, comprising reacting β-cyclodextrin, individually or in any desired mixture, in a basic liquid reaction medium with at least one etherifying agent which produces lipophilic substituents on the cyclodextrin and at least one etherifying agent which produces hydrophilic substituents on the cyclodextrin.

6. A cleaning composition comprising at least one cyclodextrin derivative as claimed in claim 1; and a cleaning agent ingredient.

7. A textile finishing composition comprising at least one cyclodextrin derivative as claimed in claim 1; and a textile finishing agent ingredient.

8. An agent for solubilizing sparingly water-soluble compounds, which comprises, at least one cyclodextrin derivative of claim 1.

9. A formulation auxiliary in pharmaceutical, cosmetic and agrochemical products, which comprises, at least one cyclodextrin derivative of claim 1.

10. An agent for stabilizing substances which are sensitive to light, heat or oxidation, which comprises, at least one cyclodextrin derivative of claim 1.

11. An agent for replacing organic solvents in the separation and extraction of substances from lipophilic media, which comprises, at least one cyclodextrin derivative of claim 1.

12. An auxiliary for coating and/or adhesion promotion in the paper, leather and textile industry, comprising at least one cyclodextrin derivative as claimed in claim 1.

13. A phase transfer catalyst, comprising at least one cyclodextrin derivative as claimed in claim 1.

14. An agent for flavor and odor masking, comprising at least one cyclodextrin derivative as claimed in claim 1.

* * * * *